(12) United States Patent
Leporini et al.

(10) Patent No.: US 10,216,948 B2
(45) Date of Patent: Feb. 26, 2019

(54) SYSTEM AND METHOD FOR THE CREATION AND MANAGEMENT OF DECENTRALIZED AUTHORIZATIONS FOR CONNECTED OBJECTS

(71) Applicant: BULL SAS, Les Clayes-sous-Bois (FR)

(72) Inventors: David Leporini, Rungis (FR); Charles Piron, Lyons (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 15/855,312

(22) Filed: Dec. 27, 2017

(65) Prior Publication Data

US 2018/0181768 A1 Jun. 28, 2018

(30) Foreign Application Priority Data

Dec. 28, 2016 (FR) ...................................... 16 63485

(51) Int. Cl.
| | |
|---|---|
| G06F 21/10 | (2013.01) |
| G06F 21/62 | (2013.01) |
| G06F 21/60 | (2013.01) |
| H04L 9/06 | (2006.01) |
| H04L 29/06 | (2006.01) |
| G06F 21/31 | (2013.01) |

(52) U.S. Cl.
CPC .......... *G06F 21/6209* (2013.01); *G06F 21/31* (2013.01); *G06F 21/604* (2013.01); *H04L 9/0637* (2013.01); *H04L 63/08* (2013.01)

(58) Field of Classification Search
CPC ................. G06F 21/31; H04L 63/08

USPC .......................................................... 726/28
See application file for complete search history.

(56) References Cited

U.S. PATENT DOCUMENTS

| | | | | |
|---|---|---|---|---|
| 2016/0261411 A1* | 9/2016 | Yau | ...................... | H04L 63/0807 |
| 2016/0294794 A1* | 10/2016 | Mancic | ................. | H04L 63/061 |
| 2016/0342982 A1* | 11/2016 | Thomas | ................ | G06Q 20/027 |
| 2016/0342983 A1* | 11/2016 | Thomas | ............... | G06Q 20/401 |
| 2016/0342988 A1* | 11/2016 | Thomas | ............... | G06Q 20/401 |
| 2017/0039330 A1* | 2/2017 | Tanner, Jr. | .............. | G06F 19/00 |
| 2017/0041296 A1* | 2/2017 | Ford | ................... | H04L 63/0421 |
| 2017/0103167 A1* | 4/2017 | Shah | ..................... | G06F 19/322 |
| 2017/0132621 A1* | 5/2017 | Miller | ................ | G06Q 20/3829 |
| 2017/0149796 A1* | 5/2017 | Gvili | ....................... | H04L 9/085 |
| 2017/0155515 A1* | 6/2017 | Androulaki | ............. | G06F 21/64 |
| 2017/0243215 A1* | 8/2017 | Sifford | ................. | G06Q 20/401 |
| 2017/0244757 A1* | 8/2017 | Castinado | .............. | H04L 63/20 |

(Continued)

OTHER PUBLICATIONS

French Search Report and Written Opinion for French Application No. FR1663485 dated Oct. 12, 2017. English translation not available.

(Continued)

*Primary Examiner* — Haresh N Patel
(74) *Attorney, Agent, or Firm* — Patterson Thuente Pedersen, P.A.

(57) ABSTRACT

Computing systems and methods for the creation and management of authorizations of blockchain objects. Systems and methods managed by a controlled number of governing entities allow the management of access authorizations for an object connected to a varying group of services. Systems and methods therefore have numerous advantages including strong inter-operability, strong resilience, confidentiality, autonomy, ensured data integrity and traceability.

14 Claims, 4 Drawing Sheets

(56) References Cited

U.S. PATENT DOCUMENTS

2017/0277909 A1* 9/2017 Kraemer ............. G06F 21/6245
2017/0278080 A1* 9/2017 Kruszka ............... G06Q 20/042
2017/0279783 A1* 9/2017 Milazzo ................ H04L 63/061
2017/0300627 A1* 10/2017 Giordano ................ G16H 10/60
2017/0372300 A1* 12/2017 Dunlevy ................ G06Q 20/36
2018/0096349 A1* 4/2018 McDonald ......... G06Q 20/3829

OTHER PUBLICATIONS

Azaria et al., "MedRec: Using Blockchain for Medical Data Access and Permission Management", 2016 $2^{nd}$ *International Conference on Open and Big Data*. Media Lab. Massachusetts Institute of Technology. Aug. 22, 2016.

Zyskind et al., "Decentralizing Privacy: Using Blockchain to Protect Personal Data", *IEEE Security and Privacy Workshops*. May 1, 2015.

Xiao et al., "Healthcare Data Gateways: Found Healthcare Intelligence on Blockchain with Novel Privacy Risk Control", Journal of Medical Systems. Aug. 26, 2016.

European Search report for European Application No. 17210750 dated May 28, 2018. Machine translation provided.

\* cited by examiner

SYSTEM AND METHOD FOR THE CREATION AND MANAGEMENT OF DECENTRALIZED AUTHORIZATIONS FOR CONNECTED OBJECTS

RELATED APPLICATION

This Application claims the benefit of French Patent Application No. FR1663485, filed Dec. 28, 2016, which is fully incorporated by reference herein.

TECHNICAL FIELD

Embodiments relate generally to the unique identity of connected objects and the management of access authorizations. More particularly, systems and methods allow for the identification, authentication and authorization using an auditable, decentralized and distributed system.

BACKGROUND

There exist numerous computing solutions allowing for the management of authorizations and identities of connected objects. In general, these solutions are based on a single, centralized management platform. The trust in this solution is generally ensured by the reputation of the centralized platform and the self-applied rules of the centralized platform. However, such centralization leads to problems of data security both in terms of data loss and non-authorized modification of the platform integrity.

Databases are available that ensure the storage of authorizations in which data are distributed over a few sites or with a few players. However, these databases are based on the principle of a single ledger replicated at several points. For example, distributed databases such as NoSQL bases (e.g. Cassandra) are based on a single reference base called a "master", which is replicated and shared on each of the sites. When there are a large number of players, this type of mechanism based on replication becomes too complex to implement and its performance is largely reduced and its coherency is not guaranteed. Therefore, this type of solution does not meet the emerging needs of increasingly numerous and connected objects, or the needs of decentralization, control and auditing of access authorizations, which would make conventional replication solutions too complex to carry out. In addition, this type of architecture is unique: one player is the master and the others are slaves. Accordingly, the master has a different role to play than those of the other players. Yet, in some situations it is not possible or desirable to have a centralized master-slave platform, even if it is replicated. For example, in a multi-player process i.e. those involving separate legal entities (several companies, etc.), it is not always easy, from a legal or commercial viewpoint, to decide which player will play the central role of platform host.

The exponential rise in the number of connected objects and of these centralized platforms leads to the complex management of identities and authorizations both for users and platforms. This is especially so since existing systems are generally specialized in a category of connected objects for which they manage identity and authorizations, since these systems are controlled by a third party and do not provide users with easy migration of identities and/or proof of authorization to other systems.

The use of a blockchain can also secure data. After data is disseminated within a blockchain community, the data cannot be rewritten, and therefore cannot be falsified. Accordingly, computing systems for the management of transactions based on blockchains such as International Patent Application Pub. No. WO2016197055 and U.S. Patent Application Pub. No. US20160261690 have been suggested. These systems are based on the management of connected objects not requiring a controlling authority, and base trust in the system on a large number of participants and cryptographically verifiable consensus of content.

Therefore, there is no satisfactory solution to ensure the management of access authorizations and identities involving several players. There is a need for systems and methods to manage connected object authorizations.

SUMMARY

Embodiments overcome the drawbacks of the prior art by systems and methods for creating and managing authorizations for connected objects that are decentralized, distributed, and auditable. In particular, systems and methods managed by a controlled number of governing entities allow the management of access authorizations for an object connected to a varying group of services. Embodiments therefore have numerous advantages such as: strong interoperability, strong resilience, confidentiality, autonomy, ensured data integrity and traceability.

In an embodiment, a computing system for the management of authorizations of connected objects comprises a plurality of storage servers comprising a blockchain distributed in the form of storage nodes, the plurality of storage servers configured to record a new block on the blockchain; an access controlling module configured to create a right of access to the blockchain, for a user of the system, the right of access including: a right of access only comprising read access; and a right of access comprising a right to record new blocks of the blockchain on one of the storage nodes, the user having said right being a governing entity; a write module for the creation of authorizations, the write module configured to: receive smart contract execution data issued by a governing entity, the smart contract execution data comprising a unique identifier of the smart contract, application conditions of the smart contract and at least one conditional authorization associated with the smart contract; and write the smart contract execution data on a storage node of the blockchain; and a connection module for the allocation of authorizations, the connection module configured to: receive connection data between a connected object and a third-party entity, the connection data including at least one authorisation request; identify, on a storage node of the blockchain, a conditional authorization related to the authorization request; verify the application conditions included in the smart contract execution data; and generate an authorization allocation instruction acceding to the authorization requestonly if all the application conditions of the conditional authorization are verified.

In contrast, traditional solutions allowing the management of connected object authorizations are generally centralized. This typically allows for the controlled and centralized access of some functionalities or services. The present invention is counter to such centralization. Embodiments described herein disclose, for example, a system wherein the management of identities is distributed and decentralised, allowing scalable management of access authorizations to services offered by different players. For this purpose, a blockchain usually used in an open frame is used in a system that is modifiable by a controlled and limited number of users (also called governing entities) having the right to record new blocks on the blockchain. In addition, the blockchain can advantageously comprise data that are at least partly encrypted.

In an embodiment, a method for managing authorizations for connected objects on a computing system of storage servers a computing system comprising a blockchain distributed in the form of storage nodes, the system including storage servers configured to record a new block on the blockchain, an access controlling module, a write module, and a connection module, comprising: defining, by the access controlling module, a right of access to the blockchain for a user, the right of access including: a right of access only comprising read access; and a right of access comprising a right to record new blocks of the blockchain, the user having said right being a governing entity; receiving, by the write module, smart contract execution data issued by a governing entity, the smart contract execution data comprising a unique identifier of the smart contract, application conditions of the smart contract, and at least one conditional authorization associated with the smart contract; writing the smart contract execution data on a storage node of the blockchain; receiving connection data, by the connection module, the connection data comprising at least one authorization request; identifying a conditional authorization related to the authorization request in the smart contract execution data written on the storage node of the blockchain, the conditional authorization being associated with the application conditions; verifying the application conditions included in the smart contract execution data; and generating an authorization allocation instruction acceding to the authorization request only if all the application conditions of the conditional authorization are verified.

In an embodiment, a system comprises a blockchain comprising a plurality of storage nodes configured to store a plurality of blocks, wherein the plurality of blocks are distributed across at least two storage nodes on non-volatile memory; a plurality of governing entities, each governing entity configured to manage at least one of the storage nodes by receiving non-confirmed data, validating the non-confirmed data, and making the validated data available to the blockchain; an access control module configured to control the number of governing entities allowed on the blockchain, the number of governing entities being less than the number of storage nodes; a connection module configured to control access to the blockchain based on an authorization request; and a connected object in electronic communication with the blockchain, the connected object configured to provide a service to the blockchain after an authorization allocation instruction based on the authorization request is generated by the connection module.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

DETAILED DESCRIPTION

Throughout the description, the terms "access authorization" and "authorization" will be used interchangeably. Therefore, "authorization" is meant a datum or set of data specifying a right to communicate, place in contact, share or access a resource. For example, the resource may be a datum, a file, a set of files, an application, a service, material or a device such as a connected object. A "conditional authorization" is an authorization associated with application conditions. The application conditions correspond to rules of control used to validate or not validate an authorization request.

By "authorization request" is meant a request to access a resource. This request is generally generated at the time of connection between a connected object and a third-party entity.

By "connected object" is meant any electronic device capable of connecting to a communication network. The communication network can be an Internet network for example, or an intranet network. The connection can be obtained by suitable communication configurations such as wired connections or wireless connections (e.g. Wi-Fi or Bluetooth).

By "block" is meant a set of validated data, for example relating to authorizations, to smart contracts, to objects or to third parties. Each block is time-stamped and refers to a preceding block (except the first block). This reference is generally obtained by inclusion within the data of the block of an imprint corresponding to the preceding block, the imprint in the remainder hereof shall be designated by the term "hash" that is more conventionally used. This makes it possible to ensure that the data of a preceding block have not been modified and that, with regard to a blockchain, the blocks follow after one another in chronological order. Therefore by "blockchain" is meant a sequence of blocks.

By "hash" is meant the result of a hashing function. In an embodiment, a hash is an imprint allowing rapid identification of source data. The hashing function allows reducing of the size of a set of source data with a cryptographic method, and allocation thereto of a unique imprint, or hash, which can only correspond to a particular set of source data. By knowing a hash, it is not possible to infer the set of source data.

By "storage nodes" are meant replicas of the blockchain recorded on storage servers.

By "storage server" is meant a device comprising a non-transient memory and being capable of connecting to a communication network.

By "smart contract" is meant a set of data. This set of data more particularly corresponds to a set of execution data and allows the defining of at least the allocation conditions of an authorization. In an embodiment, the execution data relating to a smart contract comprises a unique identifier of the smart contract, conditions for application of the smart contract, and at least one conditional authorization associated with the smart contract.

By "instruction" or "computing instruction" is meant data defining one or more actions able to be performed by an electronic device.

By "user" is meant a user of the computing system.

By "connection" is meant a communication, an access or more generally the placing in contact of two resources, subject to authorization and conditions.

Figure 1:
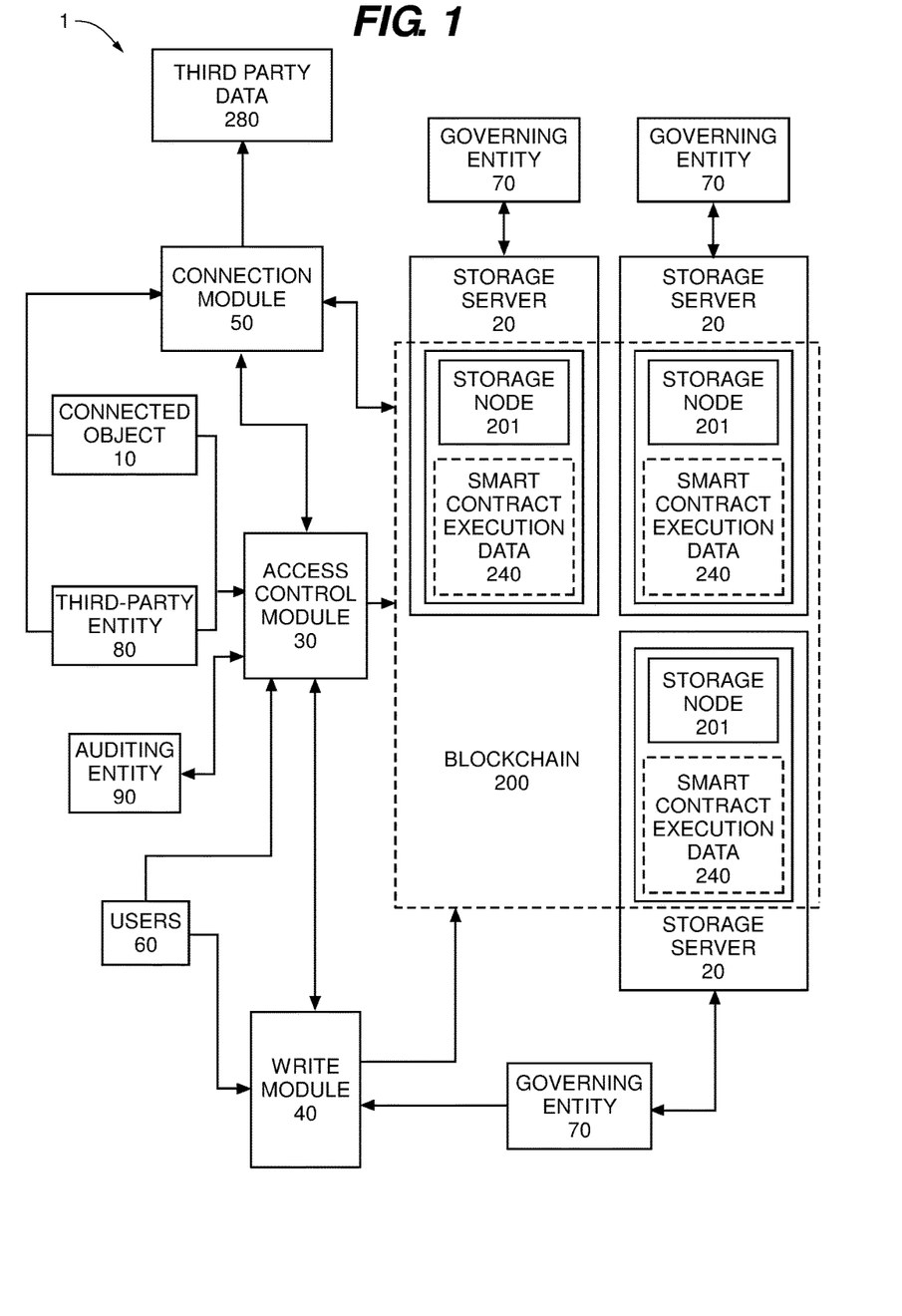
FIG. 1 is a block diagram of a computing system to create and manage authorizations for connected objects, according to an embodiment.

Referring to FIG. 1, a block diagram of a computing system 1 to create and manage authorizations for connected objects is depicted, according to an embodiment. System 1 generally comprises a plurality of storage servers 20 comprising a distributed blockchain 200 in the form of storage nodes 201.

The distribution of the blockchain 200 in the form of storage nodes 201 has the advantage of imparting resilience properties to said blockchain 200 in the event of an attack on one of the storage nodes 201. In an embodiment, the distribution which comprises a succession of blocks 202, also enables the system to have high resistance against data falsification. In embodiments, the storage servers 20 generally record data on non-volatile memories and can also comprise transitory memories.

Figure 2:
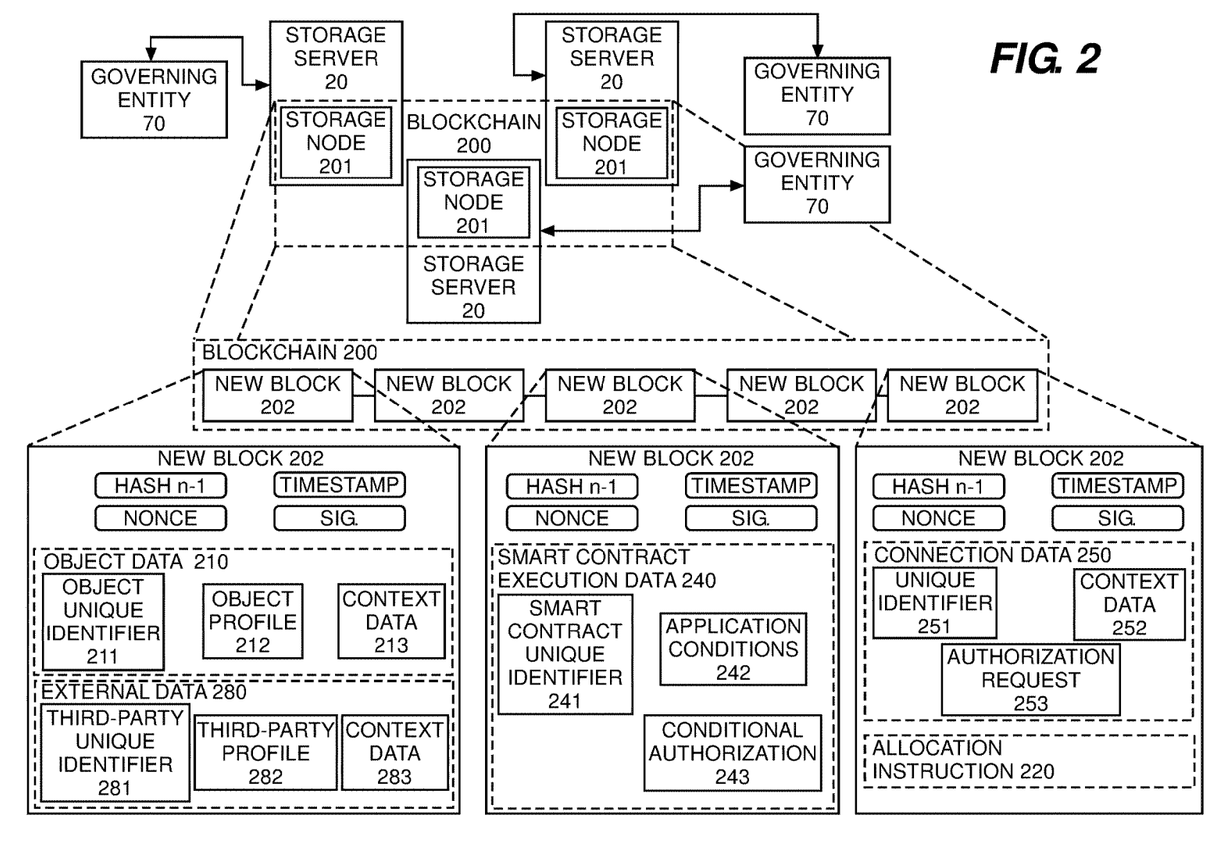
FIG. 2 is a block diagram of storage servers and content of the blockchain according to an embodiment.

Referring also to FIG. 2, a block diagram of the storage servers and content of the blockchain of FIG. 1 is depicted, according to an embodiment. As illustrated, the blockchain 200 is composed of a plurality of blocks 202 arranged chronologically. The storage servers 20 are able to record a new block 202 on the blockchain 200. In the invention, this recording can be subject to the condition of receiving a recording instruction issued by a user having adequate rights. As is detailed below, said user is called a governing entity. Each of the blocks 202 can be used to store a wide variety of data. In an embodiment, the blockchain 200 and more particularly, the blocks 202 of the blockchain 200, can be used to store object data 210 relating to connected objects 10, third-party data 280 relating to third-party entities 80, and smart contract execution data 240 relating to smart contracts.

The object data 210 can comprise at least: an object unique identifier 211 and an object profile 212. For example, the object profile 212 can comprise data selected from among its status, origin, initial owner, physical characteristics, functionalities, or permissions. The object data 210 can also include context data 213 such as, for example, the geographical location of the object.

The connected object 10 can be any electronic device able to connect to a communication network. The connected object 10 can comprise a logic access controller and/or physical access controller able to give access to a resource in accordance with an authorization allocation instruction 220. In an embodiment, the connected object 10 comprises a physical access controller. In particular the connected object 10, on the basis of a logic access right such as an authorization allocation instruction 220, is able to induce a physical access right via a physical access controller. Therefore, in one embodiment, the connected object 10 comprises a physical actuator associated with a physical access controller. In an example embodiment, the connected object 10 can be selected from among: a connected valve, a connected vehicle, a parking lot access barrier, and a connected switch. For example, a connected valve is a device configured to control the flow of a fluid such as a liquid or gas. A connected valve can be an industrial valve for example, or a private person's water or gas meter. In embodiments, the connected object 10 comprises at least one logic or physical controller and is selected from among: a connected valve, a connected vehicle and a connected switch. In an example embodiment, the connected object 10 is selected from among: a connected valve, a connected vehicle and a connected switch.

The third-party data 280 can comprise at least: a third-party unique identifier 281 and a third-party profile 282. For example, the third-party profile 282 comprises data able to be selected from among the status, origin, physical characteristics, functionalities or permissions of the third-party entity. In general, the third-party entity is selected from among: another connected object, a user, a datum, a file or set of files or a service, for example in the form of an application. The third party data 280 can also include context data 283 such as, for example, the geographical location of the object.

The smart contract 240 execution data contain at least: a smart contract unique identifier 241, application conditions 242 for the smart contract and at least one conditional authorization 243 associated with the smart contract. For example, the application conditions 242 of the smart contract can comprise conditions selected from among: a payment condition, a time condition, a location condition and a security condition. In an embodiment, authorization, this can refer for example to the right to access an application, the right to access a datum or file, authorization for the object to access a service of a third-party entity, or authorization for the third-party entity to access a functionality or data of the object. For example, for interactions between an object and a user, embodiments allows authorization given to a user to use some functionalities of the connected object, to administrate the connected object, or to change the "owner" user. By defining interactions between objects, embodiments allow for the allocation of an authorization in a manner that is secure for the confidentiality and integrity of data exchanges. Embodiments can also be used to verify the security conditions required for an object to access a service, and to notify non-fulfilled conditions in the event of refusal.

Advantageously, the conditional authorization can comprise a time limit.

In an embodiment, the blockchain 200 comprises encrypted data and non-encrypted data. For example, at least part of the third-party data 280, smart contract execution data 240 and/or object data 210 can be encrypted before recording on a storage node 201 of the blockchain 200. In one embodiment, the encrypted data can be encrypted using asymmetric encryption methods.

The storage nodes 201 correspond to copies of the blockchain 200. Each of the storage nodes 201 is preferably of equivalent importance and thus does not include a master-slave relationship between storage nodes. In an embodiment, the system can comprise storage nodes 201 managed by governing entities 70 capable of adding new blocks 202 to the blockchain 200, as well as storage nodes 201 that are not managed by governing entities 70 and are thus incapable of adding new blocks 202 to the blockchain 200. The storage servers 20 comprising storage nodes 201 that are not managed by governing entities 70 ensure replication of the blockchain 200 and therefore improve the resilience of the system. For example, some of the connected objects 10 can be associated with a dedicated storage node 201. The storage servers 20 comprising storage nodes 201 managed by governing entities 70 also ensure replication of the blockchain 200 but are also configured to manage the integration of new data in the blockchain 200 via the recording of new blocks 202 by the governing entities 70.

In an embodiment, the computing system 1 comprises a restricted number of storage nodes 201 managed by governing entities 70. For example, conventional blockchain systems based on trust generally have a multitude of storage nodes 201 with the ability to add new blocks 202. In contrast, embodiments described herein have a low probability of storage nodes capable of implementing a new block 202 on the blockchain 200. Therefore, in one embodiment, the computing system 1 comprises between 2 and 2000 storage servers 20 managed by governing entities 70. In another embodiment, the computing system 1 comprises between 2 and 1000 storage servers 20 managed by governing entities 70. In another embodiment, the computing system 1 comprises between 2 and 500 storage servers 20 managed by governing entities 70. In embodiments, a suitable number of storage nodes managed by governing entities 70 can be determined according to the relative size of the system and the relative risk involved in adding a new governing entity 70.

Conventionally, the storage nodes of blockchains can be anonymous and open to all users. When a storage node receives a new transaction, the storage node records this transaction in a memory medium comprising a set of non-confirmed transactions. Although non-confirmed transactions are propagated throughout the communication network, this set can differ from one node to another due to the propagation time of transactions on the network. Therefore, the prior art systems are based on transactions and any node is able to collect a certain number of requests for recording a transaction in its list and then form a block. Trust is provided via the fact that no entity possesses higher authority over the system, that the recording of a block is subjected to a random variable, and that there exists reciprocal control performed by miners. Miners are the entities in charge in conventional systems for updating a decentralized database, which requires the solving of a time-consuming mathematical problem by the hosts of complete storage nodes.

Unlike prior art systems, embodiments of systems and methods advantageously comprises governing entities 70 which alone have the right to record a new block 202 on the blockchain 200. This feature comprises the basis for the trust in the system 1. Therefore, each governing entity 70 administrates a memory medium comprising a set of non-confirmed data. For example, these data can correspond to object data 210, to third-party data 280 or to smart contract execution data 240. In embodiments, the non-confirmed data can be shared between the governing entities 70.

The governing entity 70 controls the validity of non-confirmed data, and once the block is validated, it is time-stamped and added to the blockchain, for example, block 202. The content of this block 202 is then accessible to users in accordance with the modalities defined by the access controlling module.

The rules for validation of the block 202 can vary as a function of embodiments and of consensus determination. For example, a block 202 can be validated by a governing entity 70 without it being necessary to search a random number (Nonce) having a value such that the hash of the block to be validated meets particular rules. On the contrary, the block can require proof-of-work. According to another embodiment, a block can also be validated further to agreement between at least two governing entities 70 without proof-of-work being required. In another embodiment, a block can be validated by agreement between at least four governing entities. In another embodiment a block can be validated by majority vote of the governing entities.

As illustrated in FIG. 2, a validated block 202 comprises the Hash of the preceding block on the blockchain (HASH n−1), and it can also contain a signature (Sig.), a time stamp (Timestamp), and/or a random number (Nonce). Once validated, the content of this block is then accessible to users 60 in accordance with the modalities defined by the access controlling module 30.

These particular validation modes are possible because the system is based on trust between the governing entities 70 and trust of users 60 towards the governing entities 70. Therefore, the system utilizes the advantages of decentralization and distribution of blockchains while preserving the security of centralized systems.

Therefore, the computing system 1 can operably couple between 2 and 2000 governing entities 70 in one embodiment, between 2 and 1000 governing entities 70 in another embodiment, or between 2 and 500 governing entities 70 in another embodiment.

In conventional systems using blockchains 200 to monitor transactions, several thousand miners in charge of validating the blocks 202 are typically connected to the system.

Referring again to FIG. 1, in addition to the governing entities 70, the system 1 is further configured to communicate with auditing entities 90. The auditing entities 90 have a right of access comprising a read access and access to decryption keys so that they can audit all or part of the encrypted data.

To allow the allocation of particular rights to the different users of the system 1, embodiments can include an architecture having an access controlling module 30. For example, although the system is decentralized and thereby benefits from the conventional advantages of distributed blockchains the system includes an access controlling module 30 configured to define the access rights of a user 60 to the blockchain 200.

Contrary to most blockchains, in the system 1 the blockchain 200 has different access rights defined as a function of the user 60. Therefore, the access controlling module 30 is configured to define a right of access, said right of access being selected from a list of rights of access comprising—for example:
  a right of access comprising only read access. This right can be granted to a majority of users in an embodiment;
  a right of access comprising a right to record new blocks 202 on the blockchain 200. The recording of new blocks 202 on the blockchain 200 allows the validation of authorizations and/or of pending data. It is this recording that confirms the validity of these data and acceptance thereof. This recording right can be given to several governing entities 70. For example, the system comprises a controlled number of governing entities 70, thereby providing a large part of the trust in the system. The number of governing entities 70 having recording rights is less than traditional blockchain systems. Therefore, the access controlling module 30 of the invention is configured to grant between 2 and 2000 rights to record new blocks 202 on the blockchain 200, or between 2 and 1000, or between 2 and 500. This corresponds to a right granted to governing entities 70.

Additional rights of access can be granted by the access controlling module 30. In an embodiment, the list of rights of access can also comprise:
  a right of access comprising write access. This right can for example allow a user to record new object data 210, third-party data 280, or smart contract execution data 240 on the blockchain 200, and/or,
  a right of access comprising read access and access to decryption keys. This right can be granted to an auditing entity 90 to verify at least part of the granted authorizations and/or data stored on the blockchain 200.

The access module 30 can be configured so as to grant a right of access only comprising read access even if the user is not authenticated in certain embodiments.

In addition, the access controlling module 30 can be configured to grant a limited number of access rights comprising write access. For example, the access controlling module 30 is configured to grant fewer than 1000 access rights comprising write access in one embodiment. In another embodiment, fewer than 500 write access rights are granted. In particular, this allows limiting of the number of users able to write in the ledger and thereby reinforces security.

Write access enables the user having this access right to write new data on the blockchain 200. In one embodiment, this right does not allow data to be made permanent with recording of a new block 202 on the blockchain 200. Therefore, after being written, these new data are placed on the blockchain 200 in a set of non-confirmed data. A governing entity 70 controls the validity of the non-confirmed data, and once these data are validated they are recorded on a new, time-stamped block 202 of the blockchain 200. The content of this block 202 is then accessible to users in accordance with the modalities defined by the access controlling module 30.

In embodiments, in addition to a right to record new blocks 202 on the blockchain 200, a governing entity 70 also has write and read access to the blockchain 200.

The access rights granted to the auditing entities 90 allow the controlling and auditing of the blockchain 200, and in particular of access authorizations on the distributed, shared blockchain. In an embodiment, the right of access comprising read access and access to decryption keys necessitates authentication of the auditing entity 90. Therefore, in one embodiment, the access controlling module 30 does not grant any access right to decryption keys and to the blockchain 200 to a non-authenticated auditing entity 90.

Similarly, the recording of new blocks 202 on the blockchain 200 requires authentication of the governing entity 70, and the access controlling module 30 does not grant any access right comprising a recording right to said non-authenticated governing entity 70.

In the same manner that the system allows controlled access to data of the blockchain 200, embodiments are based on an architecture such that the writing of smart contract execution data on the blockchain 200 is controlled by a write module 40 configured to receive and write the smart contract execution data 240 on a storage node 201. Therefore, the write module 40 is configured to receive smart contract execution data 240 issued by a governing entity 70. In an embodiment, the, smart contract execution data 240 comprises a unique identifier 241 of the smart contract, application conditions 242 of the smart contract and at least one conditional authorization 243 associated with the smart contract. Write module is further configured to record said smart contract execution data 240 on a storage node 201 of said blockchain 200.

Therefore, the write module 40 allows management of access authorizations between users and objects, between objects, and for objects themselves.

In an embodiment, the write module 40 is configured to write said smart contract execution data 240 on a storage node 201 of said blockchain 200 only if the smart contract execution data 240 are issued by a governing entity 70.

In addition, the write module 40 is also configured to receive and then write object data 210 and third-party data 280 on a storage node 201. The write module 40 is therefore configured to receive object data 210 and/or third-party data 280, and write said object data 210 and/or third-party data 280 on a storage node 201 of said blockchain 200.

The write module 40 is also configured to manage the identities and profiles of connected objects and of third parties interacting with these connected objects.

More particularly, the write module 40 is able to receive object data 210 and/or third-party data 280 issued by a user 60 and to write said object data 210 and/or third-party data 280 on a storage node 201 of said blockchain 200 only if the data are issued by a user having write access to the blockchain 200.

Advantageously, the write module 40 is able to authenticate the identity of the data source. It can thus be ensured that the identity and profile of an object written on the blockchain originates from a user having authorization for the writing thereof, thereby reinforcing the trust given to these data.

Once the object data 210, third-party data 280 and/or smart contract execution data 240 are recorded on a storage node 201 of said blockchain 200, the storage server 20 hosting said storage node 201 is able to record a new block 202 on the blockchain 200. This new block 202 contains said object data 210, third-party data 280 and/or smart contract execution data 240. To reinforce the security of the system, advantageously the storage server 20 hosting said storage node 201 is able to record a new block 202 on the blockchain 200 only if it receives a validation instruction for said data, said validation instruction being issued by a governing entity 70.

Once the data are written on the blockchain by the write module 40, these new data are placed on the blockchain 200 in a set of non-confirmed data. A governing entity 70 controls the validity of the non-confirmed data, and once these data are validated they are recorded on a new, time-stamped block 202 of the blockchain 200.

The governing entity 70 controls the validity of the non-confirmed data, and once the block 202 is validated it is time-stamped and added to the blockchain 200. The content of this block 202 is then accessible to users in accordance with the modalities defined by the access controlling module 30.

Additionally, the write module 40 allows scalable management of access authorizations to services offered by different players. The write module 40 is therefore configured to write new data that completes or modifies object data 210, third-party data 280 and/or smart contract execution data 240 already recorded in the blockchain 200.

In particular, the write module 40 is also able to write data on the blockchain 200 that were initially external to the blockchain 200. In embodiments, this initially external data can relate to services needed for the execution of some smart contracts 240, in embodiments allowing for the verification of the application conditions 242 included in the smart contract execution data 240.

Once the smart contracts are written on the blockchain 200, the system 1 allows the management of authorizations via the connection module 50. In particular the authorization comprises the allocation of a predefined and conditional authorization further to a connection between a connected object 10 and a third-party entity 80.

Contrary to traditional blockchains, it is not transactions that are managed by the system 1 but rather, authorizations. More particularly, the system manages authorizations relating to a connected object 10. For example, consider an authorization relating to an interaction between a connected object 10 and a third-party entity 80. In this embodiment, the connection module 50 is configured to: receive connection data 250 between a connected object 10 and a third-party entity 80, said connection data 250 comprising at least one authorisation request 253; The connection data 250 can also comprise a unique identifier 251 and context information 252; for example, the entities involved in the authorization request 253. The connection module 50 is further configured to identify, on a storage node 201 of the blockchain 200, a conditional authorisation 243 complementing said authorisation request 253. The connection module 50 is further configured to verify the application conditions 242 included in the smart contract execution data 240. The connection module 50 is further configured to generate an authorization allocation instruction 220 acceding to the authorization request 253 only if all the application conditions 242 of said conditional authorization 243 are verified.

In addition, the connection module 50 can be configured to record the connection data 250 on a storage node 201 of the blockchain 200. If so, this allows ensured traceability of the connections made and auditability of the system.

In an embodiment, the blockchain 200 comprises all smart contract execution data validated by the governing entities 70 and, despite the impossibility of modifying the preceding blocks 202 of the blockchain 200, the system 1 advantageously allows updating of access authorizations. For this purpose, the connection module 50 is able to verify in priority the most recent application conditions 242.

The authorization allocation instruction 220 can be for example, severing of the association between the connected object 10 and associated third-party entity 80, authorization given to the connected object 10 to access a service of the third-party entity 80, or authorization given to the third-party 80 to access a functionality or data of the connected object 10.

In an embodiment, the connection module 50 is able to transmit the authorization allocation instruction to a virtual machine for execution thereof.

In addition, advantageously, the connection module 50 is also able to record the authorization allocation instruction 220 on the blockchain 200. The connection module 50 advantageously has access rights corresponding to the rights of the governing entities 70 and hence an access right comprising a right to record new blocks 202 of the blockchain 200. When applicable, this allows ensured traceability of granted authorizations and auditability of the system.

In particular, the connection module 50 is able to access external data 280 not written or recorded in the blockchain 200 but nonetheless necessary for verifying application conditions 242 included in the smart contract execution data 240.

Figure 3:
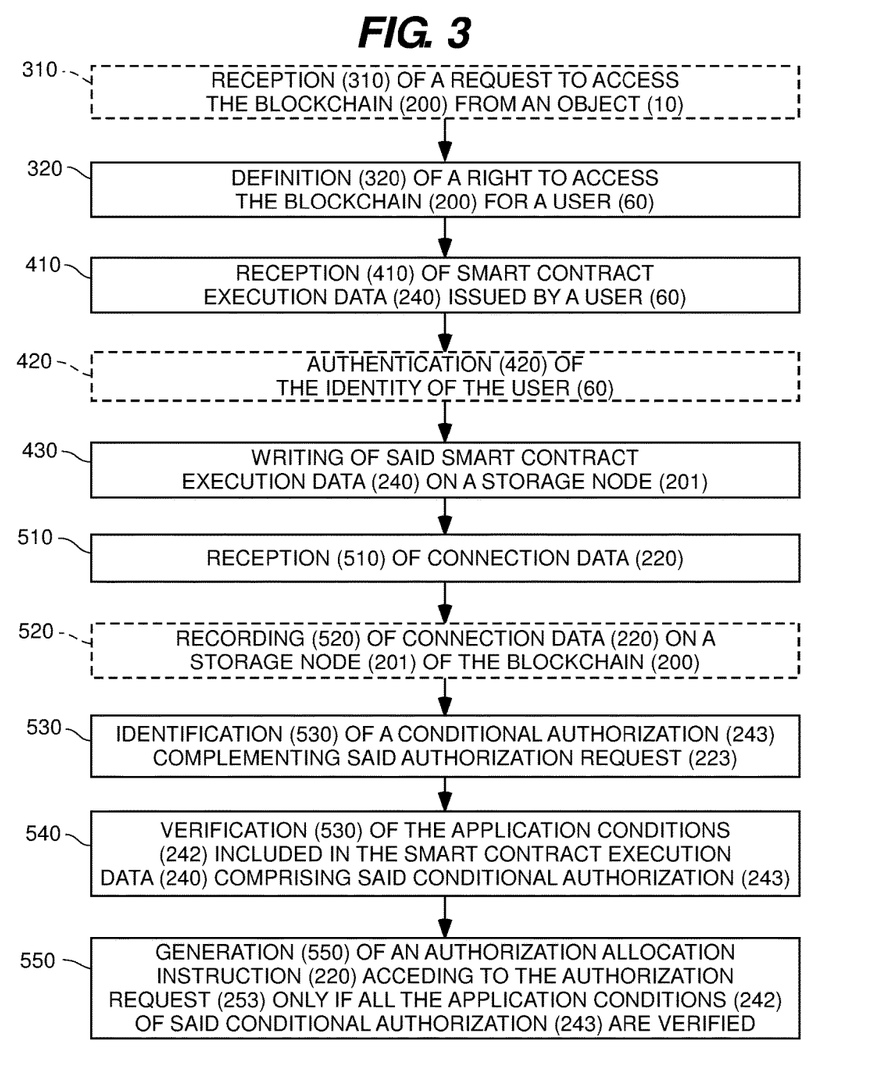
FIG. 3 is a flowchart of a method for creating and managing authorizations of connected objects, according to an embodiment.

Referring to FIG. 3, a flowchart of a method for creating and managing authorizations of connected objects is depicted, according to an embodiment.

The method of FIG. 3 can be performed by a computing system comprising a blockchain 200 able to store smart contract execution data 240, an access controlling module 30, a write module 40 and a connection module 50, such as system 1 in FIGS. 1-2. In general, the method of FIG. 3 comprises the—allocation of rights of access; the creation or modification of smart contracts 240; and the allocation of authorizations.

The instant method is distinguished from conventional methods through the setting-up of a high control level over the creation and management of authorizations. To perform such control, the method comprises the following for allocation of rights of access Receiving 310 of a request to access the blockchain 200 submitted by a user 60;

Allocation 320 granted to the user 60 by the access controlling module 30 of a right to access the blockchain 200, said right of access being, for example
right of access with only read access; or
right of access comprising a right to record new blocks on the blockchain.

In an embodiment, the right of access can be, for example:
right of access with write access; or
right of access with read access and access to decryption keys.

Referring again to FIG. 3 and the creation or modification of a smart contract 240, the method further comprises:

Reception 410, by the write module, of smart contract execution data 240 issued by a user 60, said smart contract execution data 240 comprising a unique identifier 241 of the smart contract, application conditions 242 for the smart contract and at least one conditional authorization 243 associated with the smart contract; and Writing 430 of said smart contract execution data on a storage node 201 of said blockchain 200 only if the right of access of the user 60 comprises write access.

Regarding allocation of authorizations, the method further comprises:

reception 510, by a connection module 50, of connection data 250, said connection data 250 comprising at least one authorization request 253;

identification 530 of a conditional authorization 243 complementing said authorization request 253 in the smart contract execution data 240 written on a storage node 201 of the blockchain 200, said conditional authorization 243 being associated with application conditions 242;

verification 540 of said application conditions 242 included in the smart contract 240 execution data; and generation 550 of an authorization allocation instruction 220 acceding to the authorization request 253 only if all the application conditions 242 of said conditional authorisation 243 are verified.

In an embodiment, the method can further comprise the recording 520 of connection data 250 on a storage node 201 of the blockchain 200. For example, the method can further comprise
enrollment of users 60;
recording 600 of blocks 202 on the blockchain 200;
revocation of an authorization; and
auditing of data on the blockchain 200.

In an embodiment, revocation of an authorization comprises:

generation, by a governing entity 70, of data revoking the association between an object 10 and a third-party entity 80, the revocation data comprising a date and at least one rule of behavior prohibiting access of the object 10 and of said third-party entity 80;

writing, by said governing entity 70, of said revocation data on the blockchain 200, and recording, by said governing entity 70, of a new block 202 containing the revocation data on the distributed blockchain.

The auditing of data on the blockchain 200 comprises:
Issuing of an audit request by an auditing entity 90;
Authentication, by the access controlling module 30, of the auditing entity 90; and
Transmission to the auditing entity 90, by the access controlling module 30, of decryption keys for full or partial decryption of the blockchain 200 if the access rights of the auditing entity 90 were confirmed at the time of authentication 920.

Figure 4:
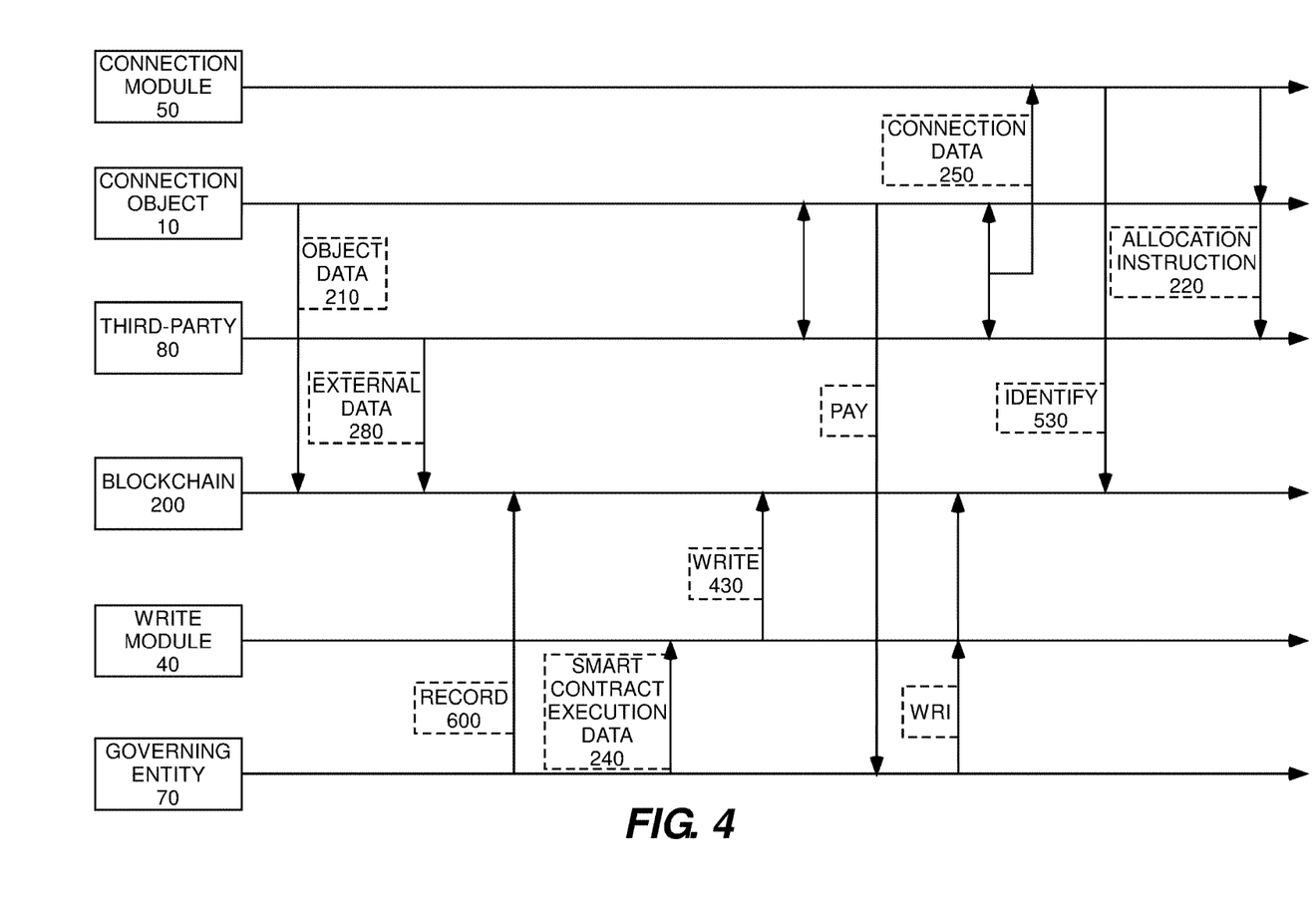
FIG. 4 is a block diagram of component interaction of a system for the creation and management of access authorization for a connected vehicle, according to an embodiment.

Referring to FIG. 4, a block diagram of component interactions of a system for the creation and management of access authorization for a connected vehicle are depicted, according to an embodiment. In FIG. 4, the connected object 10 is a connected vehicle, and embodiments can provide service to a consortium of companies offering access to parking lots 80 where each of the companies is a governing entity 70 able to modify the blockchain 200. Other companies can be added to this consortium which offer other services adapted for connected vehicles, such as insurance companies. Accordingly, each company offering parking lot services and member insurance companies can deploy a storage server 20 comprising a storage node 201.

In one embodiment, the object data 210 is written on the blockchain by the connected object 10. The object profile 212 can comprise data such as identification of the manufacturer, the model, year of manufacture of the vehicle, but also an identifier of the owner and/or user of the vehicle and data on services to which the vehicle is subscribed. For example, the third-party entity 80 can be a parking lot and the third-party data 280 written on the blockchain 200 by a parking lot management company 70. The third-party profile 282 can comprise data on the number of parking spaces, restrictions on entry to this parking lot (authorizations, vehicle heights, etc.) and/or the company in charge of managing the parking lot. These object data 210 and third-party data 280, after validation by a governing entity, can be written on the blockchain 200.

In this particular embodiment in which the connected object is a connected vehicle, the parking lot benefits from a right of access only comprising read access to the blockchain 200, the vehicle benefits from a right of access comprising read and write access to the blockchain 200, and a company 70 belonging to the consortium of companies offering parking services benefits from a right of access comprising the right to record new blocks 202 on the blockchain 200.

At the time of creating or modifying 400 a smart contract 240, the company managing the parking service sends the write module 40 execution data for the smart contract 240 comprising the smart contract identifier 241, the application conditions 242 comprising for example verification of the rate of occupation of the parking lot, verification of the subscription status of the vehicle to the parking service and at least one conditional authorization 243 corresponding for example to the authorization of the vehicle to enter the parking lot.

Once the execution data of the smart contract 240 have been received, the write module 40 performs authentication 420 of the identity of the parking lot management company, and if this identity is validated the write module writes 430 said smart contract execution data on a storage node 201 of said blockchain 200. The storage server hosting the storage node 201 records a new block 202 on the blockchain 200. This block comprises said smart contract 240 execution data.

In this particular embodiment, the connected vehicle 10 can already benefit from a subscription with a parking service management company. In this case, at the time of a connection between the connected vehicle 10 and the parking lot 80, a connection module 50 receives the connection data 250 comprising at least one authorization request 253. For example, these data can be sent by the connected vehicle 10 or the parking lot 80. The connection module 50 having access to the blockchain 200, in the smart contract execution data 240 written on the blockchain 200, identifies 530 a conditional authorization 243 complementing the authorization request 253. The connection module 50 then verifies whether the application conditions are verified (e.g. rate of occupation of the parking lot and subscription status of the vehicle to the parking service) and, when applicable, generates an authorization allocation instruction 220 acceding to the request for authorization to enter the parking lot.

Alternatively, the vehicle can enter a parking lot without having previously taken out a subscription to this service. In this case, after connection between the connected vehicle 10 and the parking lot 80, the vehicle or a third party pays (PAY) the company 70 managing the parking service. This payment is written on a node of the blockchain and a new block comprising this writing is recorded (WRI). The connection module 50 receives the connection data 250 comprising at least one authorization request 253. The connection module 50 having access to the blockchain 200 identifies 530, in the smart contract execution data 240 written on the blockchain 200, a conditional authorization 243 complementing the authorization request 253. The connection module 50 verifies whether the application conditions are verified (here payment for example) and when applicable generates an authorization allocation instruction 220 acceding to the request for authorization to enter the parking lot.

The system of the invention therefore groups together the advantages of decentralization and distribution of blockchains, while preserving the security of centralized systems. Having regard to all these advantages, it is possible to set up trust between several players having their own interests and own governance within a distributed, shared ledger system.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A computing system for the management of authorizations of connected objects, the computing system comprising:
- a plurality of storage servers comprising at least one memory and a blockchain distributed in the form of storage nodes, the plurality of storage servers configured to record a new block on the blockchain;
- an access controlling module configured to create a right of access to the blockchain, for a user of the system, the right of access including:
  - a right of access only comprising read access; and
  - a right of access comprising a right to record new blocks of the blockchain on one of the storage nodes, the user having said right being a governing entity;
- a write module for the creation of authorizations, the write module configured to:
  - receive smart contract execution data issued by a governing entity, the smart contract execution data comprising a unique identifier of the smart contract, application conditions of the smart contract and at least one conditional authorization associated with the smart contract; and
  - write the smart contract execution data on a storage node of the blockchain; and
- a connection module for the allocation of authorizations, the connection module configured to:
  - receive connection data between a connected object and a third-party entity, the connection data including at least one authorisation request;
  - identify, on a storage node of the blockchain, a conditional authorization related to the authorization request;
  - verify the application conditions included in the smart contract execution data; and
  - generate an authorization allocation instruction acceding to the authorization request only when all the application conditions of the conditional authorization are verified.

2. The system according to claim 1, wherein the connection module is further configured to record the authorization allocation instruction on the blockchain.

3. The system according to claim 1, wherein the connection module is further configured to transmit the authorization allocation instruction to a virtual machine for execution.

4. The system according to claim 1, wherein the blockchain comprises encrypted data and non-encrypted data.

5. The system according to claim 1, wherein the blockchain comprises object data relating to the connected object, the object data including an object unique identifier and an object profile.

6. The system according to claim 5, wherein the object profile comprises data including at least one of: status, origin, physical characteristics, functionalities, and permissions.

7. The system according to claim 1, wherein the blockchain comprises third-party data relating to the third-party entity, the third-party data including a third-party unique identifier and a third-party profile.

8. The system according to claim 1, wherein the third-party entity is selected from among: another connected object, a user, a datum, a file or set of files, or a service.

9. The system according to claim 1, wherein the connected object comprises at least one logic controller or physical controller and is at least one of a connected valve, a connected vehicle, and a connected switch.

10. The system according to claim 1, wherein at least part of the third-party data, the smart contract execution data and the object data are encrypted before being recorded on a storage node of the blockchain.

11. The system according to claim 1, wherein the application conditions include conditions selected from among: a payment condition, a time condition, a location condition, and a security condition.

12. The system according to claim 1, wherein the connection module is further configured to verify in priority a most recent application conditions.

13. The system according to claim 1, wherein the authorization allocation instruction at least one of a severing of an association between the connected object and associated third-party entity, an authorization given to the connected object to access a service of the third-party entity, and an authorization given to the third-party entity to access a functionality or data of the connected object.

14. A method for managing authorizations for connected objects on a computing system of storage servers comprising a blockchain distributed in the form of storage nodes, the storage servers configured to record a new block on the blockchain, an access controlling module, a write module, and a connection module, the method comprising:
- defining, by the access controlling module, a right of access to the blockchain for a user, the right of access including:
  - a right of access only comprising read access; and
  - a right of access comprising a right to record new blocks of the blockchain, the user having said right being a governing entity;
- receiving, by the write module, smart contract execution data issued by a governing entity, the smart contract execution data comprising a unique identifier of the smart contract, application conditions of the smart contract, and at least one conditional authorization associated with the smart contract;
- writing the smart contract execution data on a storage node of the blockchain;
- receiving connection data, by the connection module, the connection data comprising at least one authorization request;
- identifying a conditional authorization related to the authorization request in the smart contract execution data written on the storage node of the blockchain, the conditional authorization being associated with the application conditions;
- verifying the application conditions included in the smart contract execution data; and generating an authorization allocation instruction acceding to the authorization request only when all the application conditions of the conditional authorization are verified.

* * * * *